US009324193B2

(12) United States Patent
Sudolsky et al.

(10) Patent No.: US 9,324,193 B2
(45) Date of Patent: Apr. 26, 2016

(54) METHODS AND SYSTEMS FOR COST-BASED CONTROL OF AIRCRAFT HEALTH DATA REPORTING

(75) Inventors: Michael D. Sudolsky, Huntington Beach, CA (US); Jeanne C. Maggiore, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 13/227,780

(22) Filed: Sep. 8, 2011

(65) Prior Publication Data

US 2013/0066515 A1 Mar. 14, 2013

(51) Int. Cl.

*G01M 17/00* (2006.01)
*G07C 5/00* (2006.01)
*G07C 5/08* (2006.01)

(52) U.S. Cl.

CPC .............. *G07C 5/008* (2013.01); *G07C 5/0841* (2013.01)

(58) Field of Classification Search

USPC ................................................ 701/31.4, 31.5
See application file for complete search history.

(56) References Cited

U.S. PATENT DOCUMENTS

| | | | | | |
|---|---|---|---|---|---|
| 4,943,919 | A | | 7/1990 | Aslin et al. | |
| 5,121,325 | A | * | 6/1992 | DeJonge | G05D 1/0005 244/182 |
| 6,115,656 | A | | 9/2000 | Sudolsky | |
| 6,167,343 | A | * | 12/2000 | Bauerle | F02D 11/105 123/350 |
| 6,356,841 | B1 | * | 3/2002 | Hamrick | G01S 19/16 128/903 |
| 6,484,079 | B2 | * | 11/2002 | Buckelew | B28C 5/422 340/439 |
| 6,544,144 | B2 | * | 4/2003 | Ehrmaier | F16H 61/12 477/110 |
| 6,574,537 | B2 | | 6/2003 | Kipersztok et al. | |
| 6,618,654 | B1 | | 9/2003 | Zaat | |
| 6,691,007 | B2 | | 2/2004 | Haugse et al. | |
| 6,751,536 | B1 | | 6/2004 | Kipersztok et al. | |
| 7,065,433 | B2 | | 6/2006 | Basu et al. | |
| 7,230,527 | B2 | | 6/2007 | Basu et al. | |
| 7,577,525 | B2 | * | 8/2009 | Hamrick | G08B 25/001 340/991 |

(Continued)

FOREIGN PATENT DOCUMENTS

| | | | |
|---|---|---|---|
| EP | 1806880 | A1 | 7/2007 |
| WO | 2009025789 | A1 | 2/2009 |

OTHER PUBLICATIONS

International Preliminary Report on Patentability for PCT App. No. PCT/US2012/049298 dated Mar. 12, 2014, 6 pages.

*Primary Examiner* — John R Olszewski
*Assistant Examiner* — Jean-Paul Cass
(74) *Attorney, Agent, or Firm* — Armstrong Teasdale LLP

(57) ABSTRACT

A method for reporting aircraft data is described that includes receiving, at a processing device, data relating to a condition experienced during operation of the aircraft, determining a cost relevance for the data, comparing, with the processing device, the cost relevance for the data to a threshold, transmitting the data to an end user system if the cost relevance exceeds the threshold, and storing the data in a memory if the cost relevance does not exceed the threshold.

10 Claims, 6 Drawing Sheets

(56) References Cited

U.S. PATENT DOCUMENTS

| | | | | | |
|---|---|---|---|---|---|
| 7,668,744 | B2 * | 2/2010 | Tiourine | G06Q 10/06 | 705/7.13 |
| 7,684,936 | B2 * | 3/2010 | Bechhoefer | G05B 23/0283 | 701/31.4 |
| 7,719,441 | B1 * | 5/2010 | Dong | H03M 7/14 | 341/50 |
| 7,725,218 | B2 * | 5/2010 | Hamrick | G08B 25/001 | 340/426.16 |
| 8,121,140 | B2 * | 2/2012 | McGuffin | H04B 7/18506 | 370/431 |
| 8,131,838 | B2 * | 3/2012 | Bornhoevd | G06F 9/54 | 709/217 |
| 8,296,107 | B2 * | 10/2012 | Turner | G05B 17/02 | 703/12 |
| 8,340,067 | B2 * | 12/2012 | Buga | H04B 7/18506 | 370/338 |
| 2002/0032517 | A1 * | 3/2002 | Buckelew | B28C 5/422 | 701/31.4 |
| 2005/0065716 | A1 * | 3/2005 | Timko | G01S 19/16 | 701/29.3 |
| 2006/0212186 | A1 * | 9/2006 | Philp | B61L 27/0016 | 701/19 |
| 2007/0286111 | A1 * | 12/2007 | Corson | H04L 5/0016 | 370/319 |
| 2008/0082694 | A1 * | 4/2008 | Labbe | H04B 7/18508 | 709/247 |
| 2008/0279131 | A1 * | 11/2008 | Malladi | H04W 56/0045 | 370/311 |
| 2008/0300738 | A1 * | 12/2008 | Coulmeau | G01C 21/20 | 701/3 |
| 2009/0017861 | A1 * | 1/2009 | Wu | H04W 52/246 | 455/522 |
| 2009/0019183 | A1 * | 1/2009 | Wu | H04L 5/0053 | 709/248 |
| 2010/0121522 | A1 * | 5/2010 | Wolfson | G01S 5/0027 | 701/31.4 |
| 2010/0256861 | A1 | 10/2010 | Hodges | | |
| 2011/0022664 | A1 * | 1/2011 | Ainsworth | G06Q 10/107 | 709/206 |
| 2011/0251868 | A1 * | 10/2011 | Mikurak | G06Q 10/06 | 705/7.25 |
| 2011/0302616 | A1 * | 12/2011 | Mizukami | H04B 10/116 | 725/76 |
| 2012/0177198 | A1 * | 7/2012 | Cabos | H04L 9/0825 | 380/270 |
| 2013/0030630 | A1 * | 1/2013 | Luke | B60S 5/06 | 701/22 |

* cited by examiner

500

| Priority Level | Explanative Report Info |
|---|---|
| .1 | Lowest (nuisance) |
| .2 | Unused circuitry |
| .4 | Self Test Circuitry |
| ... | ... |
| .8 | Redundant Circuitry |
| ... | ... |
| 20 | Trend |
| ... | ... |
| 100 | Yellow |
| ... | ... |
| 250 | Amber |
| ... | ... |
| 1,000 | Red |

(Satcom Report Made if > 249)
(UHF Report Made if > 50)

FIG. 5

METHODS AND SYSTEMS FOR COST-BASED CONTROL OF AIRCRAFT HEALTH DATA REPORTING

BACKGROUND

The field of the disclosure relates generally to the providing of aircraft health data reporting to a user, and more specifically, to methods and systems for cost-based control of aircraft health data reporting.

Vehicles, particularly commercial air, marine and land vehicles, typically include some type of performance monitoring system that records data regarding the vehicle performance, which includes the performance of the various components of the vehicle, such as a fault in one of the vehicle subsystems. The data includes a record of certain performance events that occur during the operation of the vehicle. The performance monitoring system typically conducts data collection and reports all of the data collected to the user. The user then may utilize the data in determining the type of maintenance, if any, that the vehicle may need. For example, if the data indicates that a particular component of the vehicle is malfunctioning or that the performance of one or more components may contribute to a vehicle failure in the future, then the user can perform the appropriate maintenance on the vehicle at the next opportunity.

One problem with current aircraft health reporting systems such as the aircraft communications addressing and reporting system (ACARS) are the costs of transmission. Particularly, automated wireless data link reporting systems such as ACARS are configured to have a standard set of reports that are programmed to be sent every flight, perhaps multiple times per flight.

If airlines make reports of "everything" (e.g., including servicing reports), transmission costs are much higher then needed. However, if the airlines only record the data for later retrieval after the plane lands, for example (and therefore not utilize a data link for transmission to the ground while still in flight), transmission costs are certainly reduced, but an unwanted schedule interruption may result. Specifically, the schedule interruption occurs from not transmitting the report when an emergent condition warrants maintenance action readiness upon landing, and without utilization of the data link such emergent condition information cannot be known until after the airplane lands. Further, some airlines do not always download the recorded data after every flight.

An example scenario illustrating this problem is that tire pressure reports might be sent every flight. But the sending of tire pressure reports is expensive as described above. Under normal circumstances tire pressure readings do not warrant having a maintainer or maintenance center check these pressures every flight. But if the airline turns off the tire pressure reports and stores them for later, the following scenario can occur: a tire pressure drop calls for an immediate maintenance action (replace the wheel and tire) upon arrival at the gate while the passengers disembark/embark. Without the data link providing this information while the aircraft is in flight (e.g., during the take-off phase of flight), a maintenance delay will occur when the aircraft is on ground because of the inability of the airlines to know ahead of time that the tire had to be changed. It is possible that the low pressure situation may not be found until just before departure, during preflight checkout, when a pilot is alerted that the tire pressure is too low for the flight to proceed. The flight must be delayed until the proper maintenance action such as tire replacement. Such delays are bothersome for airline customers and can be costly to the airline. Had the low pressure information been transmitted in flight, the delay could probably have been avoided. In summary, under the currently available health monitoring systems and methods, airlines either incur the transmission expenses or suffer possible on ground schedule delays.

BRIEF DESCRIPTION

In one aspect, a method for reporting aircraft data is provided. The method includes receiving, at a processing device, data relating to a condition experienced during operation of the aircraft, determining a cost relevance for the data, comparing, with the processing device, the cost relevance for the data to a threshold, transmitting the data to an end user system if the cost relevance exceeds the threshold, and storing the data in a memory if the cost relevance does not exceed the threshold.

In another aspect, a vehicle monitoring system is provided that includes at least one processing device, a memory communicatively coupled to the processing device, and at least one communications interface communicatively coupled to the processing device. The system is programmed to receive, via the at least one communications interface, data relating to a condition experienced during operation of the vehicle, determine a cost relevance for the data, compare the cost relevance for the data to a threshold stored in the memory, transmit the data, via the at least one communications interface, to an external system if the cost relevance exceeds the threshold, and store the data in the memory if the cost relevance does not exceed the threshold.

In still another aspect, one or more computer-readable storage media having computer-executable instructions embodied thereon are provided. When executed by at least one processor, the computer-executable instructions cause the at least one processor to determine a cost relevance for received data relating to an aircraft condition, the cost relevance based on a priority associated with the data and a cost of transmitting the data to an external system, transmit the received data to the external system if the cost relevance exceeds a threshold, and store the data in a memory if the cost relevance does not exceed the threshold.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 5 is a priority level list table.

DETAILED DESCRIPTION

The described embodiments are directed to a "cost relevance" configuration for aircraft health data reports that are scheduled for transmission to the ground. The cost relevance provides criteria for the report generation system, such as the airplane condition monitoring system (ACMS) or data from another health maintenance application, to disposition and configure the report output to the optimal destination. Based on the content, a decision is made whether to transmit the data immediately, for example, through a datalink, or store the data onboard for later download when the aircraft is parked at a facility with such download capability. In embodiments, such decisions are in part driven by safety concerns, but when safety is not an issue, the download can be whichever of the data link and the on ground download that is the most cost effective per the configuration definition customized by the user.

In one embodiment, technical effects of the methods, systems, and computer-readable media described herein include at least one of: (a) receiving data relating to a condition experienced during operation of the vehicle, (b) determining a cost relevance for the data, (c) comparing the cost relevance for the data to a threshold stored in a memory, (d) transmitting the data to an external system if the cost relevance exceeds the threshold, and (e) storing the data in a memory if the cost relevance does not exceed the threshold.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
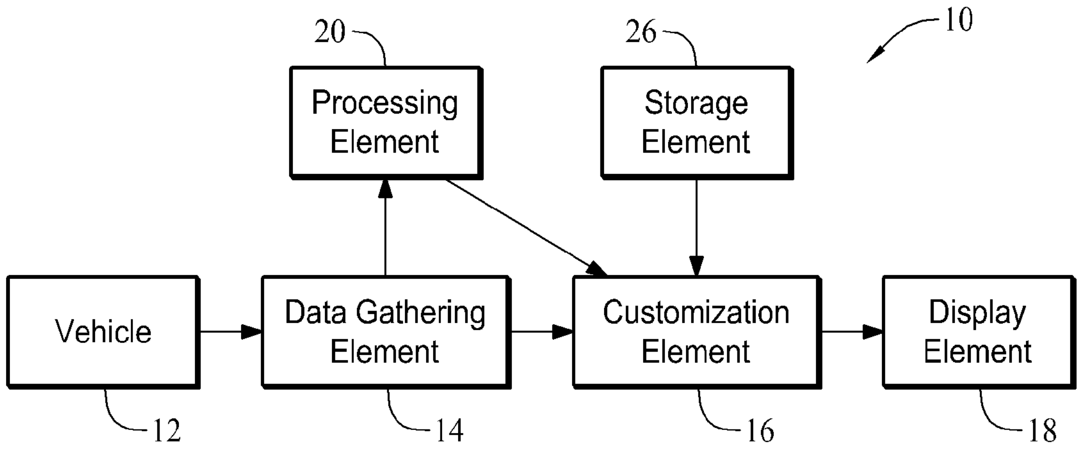
FIG. 1 is block diagram of a vehicle monitoring system.

As shown in FIG. 1, vehicle monitoring system 10 includes at least a data gathering element 14, a customization element 16 and a display element 18. The vehicle monitoring system may monitor the operations of any type of vehicle 12, such as air, marine and land vehicles or the like, which includes monitoring the operation of the vehicle as a whole and/or the various components of the vehicle. Thus, the data gathering element 14 may be any type of system or device capable of receiving data associated with the operation and performance of the vehicle 12 and may vary as will be recognized by those skilled in the art depending upon the type of vehicle and/or the component(s) of the vehicle being monitored. For example, the data gathering element 14 may be a central maintenance computer (CMC) and/or an aircraft condition monitoring system (ACMS). A CMC and an ACMS monitor, collect, consolidate and report performance data for the components of the air vehicle. As such, the CMC and/or ACMS provide the necessary vehicle performance data that is utilized and further analyzed in the system 10.

The data includes any type of performance-related data regarding the overall operation of the vehicle 12 or any component or combination of components of the vehicle. The data may include information regarding a fault experienced by the vehicle or any component or combination of components of the vehicle. In addition, the data may include prognostic information regarding the vehicle or any component or combination of components of the vehicle that may be used to indicate whether a fault is likely. In particular, the data generally includes a record of certain performance events that occur during the operation of the vehicle. For example, a performance event may be a failure of a component or a portion of a component, which may affect the performance of the vehicle either immediately or eventually.

The data gathering element 14 may also receive other types of data that may be integrated with the performance data. For example, data associated with the design of the vehicle, a maintenance history of the vehicle, a maintenance supply list for the vehicle and/or an aggregate performance for the type of vehicle may be received by the data gathering element 14 and integrated with the vehicle performance data that is collected by the data gathering element. This additional data may be provided in various manners, including being originally provided by the manufacturer of the vehicle and then updated by the maintenance personnel.

Once the data is collected, the data gathering element 14 makes the data available to the customization element 16. For instance, the data gathering element 14 may transmit the data to the customization element 16 or the customization element 16 may access the data from the data gathering element 14. Thus, the data gathering element and the customization element may be located within the vehicle or outside the vehicle. For instance, the data gathering element 14 may be located within the vehicle while the customization element 16 is located outside the vehicle, and there may be a communication link between the elements for the data to travel between the elements. In other embodiments of the system 10, the data gathering element 14 may include the customization element 16, such that a communication link between the elements is not necessary. The communications link(s) described herein may be any type of communication link known to those skilled in the art. In addition the data gathering element 14 and/or the customization element 16 may include a storage element for storing any of the data collected by and/or utilized by the system 10.

Figure 2:
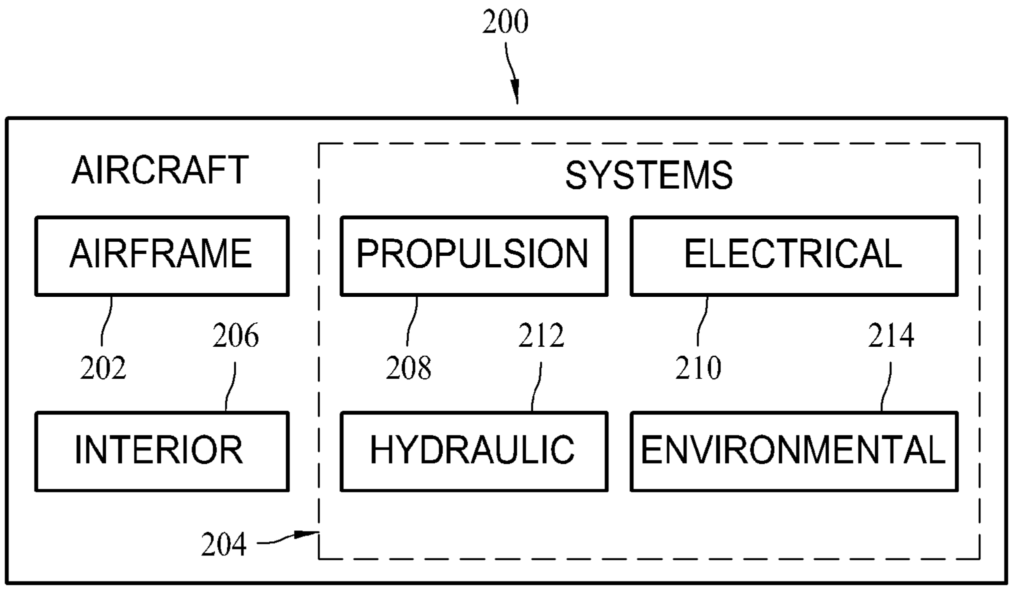
FIG. 2 is a block diagram of an aircraft.

An aircraft 200 block diagram is shown in FIG. 2 into which vehicle monitoring system 10 can be incorporated. Aircraft 200 may include airframe 202 with a plurality of systems 204 and interior 206. Examples of systems 204 include one or more of propulsion system 208, electrical system 210, hydraulic system 212, and environmental system 214. Vehicle monitoring system 10 may be operatively coupled to any or all of the systems 204. Any number of other systems may be included in this example. Although an aerospace example is shown, the principles of the disclosure may be applied to other industries, such as the automotive industry.

Apparatus and methods embodied herein may be employed during any one or more of the stages of an aircraft manufacturing and service method. For example, without limitation, components or subassemblies corresponding to component and subassembly manufacturing may be fabricated or manufactured in a manner similar to components or subassemblies produced while aircraft 200 is in service.

Also, one or more apparatus embodiments, method embodiments, or a combination thereof may be utilized during component and subassembly manufacturing and system integration, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service used during system integration and/or maintenance and service to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
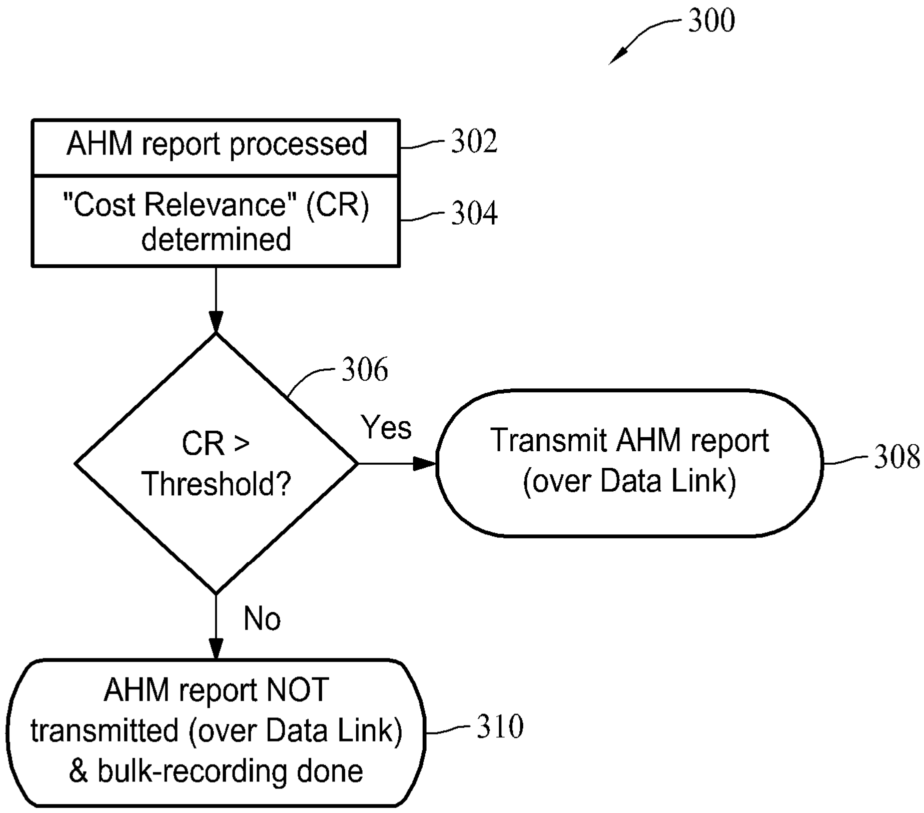
FIG. 3 is a flow chart illustrating a simple optimized cost reporting method.

FIG. 3 is a flow chart 300 illustrating a simple optimized cost reporting method that might be incorporated into the vehicle monitoring system 10 of FIG. 1. Referring to FIG. 3, a report is processed 302, for example from an ACMS, and a cost relevance is determined 304. If the cost relevance is greater than a threshold 306, the report is transmitted 308 over a data link, with the transmission costs being incurred. Conversely, if the cost relevance is not greater than a threshold 306, the report is not transmitted 310, being saved in a memory, for example, for downloading when the aircraft is on ground, and communicatively coupled to a data collection system.

Figure 4:
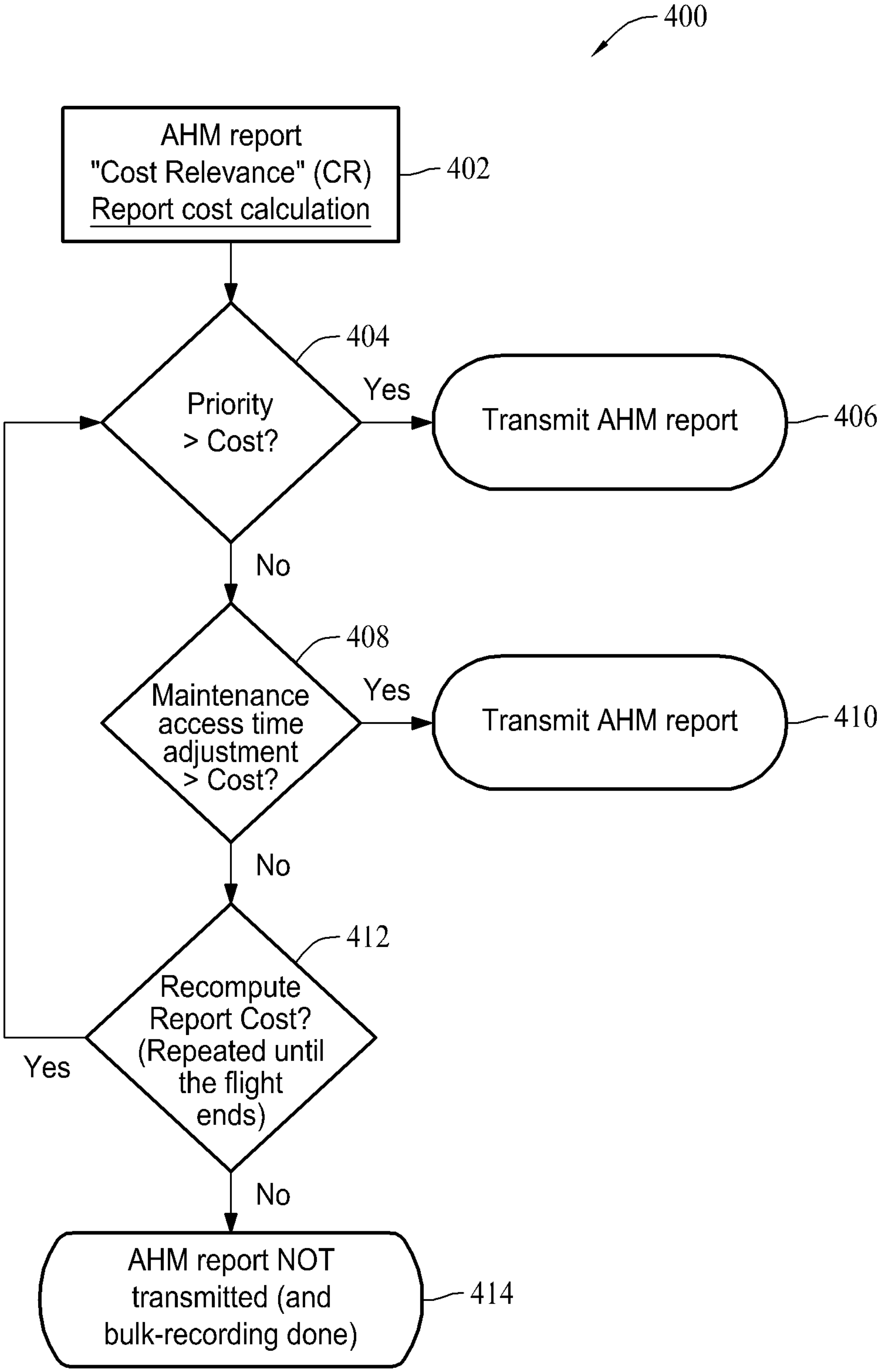
FIG. 4 is a flowchart that illustrates cost relevance determination.

FIG. 4 is a flowchart 400 that illustrates cost relevance determination. Initially, a cost is calculated 402 for transmission of the report over the data link. If a priority associated with the report is greater than 404 the cost calculation, the report is transmitted 406 over the data link. If a priority associated with the report is not greater than 404 the cost calculation, then it is determined 408 if the maintenance time adjustment for not transmitting the report is now greater in cost than the cost for transmitting the report over the data link. If it is determined 408 that the maintenance time adjustment is now greater in costs, then the report is transmitted 410 over the data link.

The cost of transmitting the report is recomputed 412 against the priority and maintenance time adjustments for the duration of the flight. If at any point the priority and/or maintenance time adjustment cost are greater than the cost of data link transmission, then the report will be transmitted over the data link. Otherwise, the report is not transmitted and the information is stored 414 until the aircraft is on the ground and attached to a hard wired network for retrieval and upload of such information.

In one embodiment, aircraft health maintenance (AHM) reports are color coded based on their priority. In the embodiment, an AHM report that is coded "red" will be immediately transmitted over the data link. An "amber" or "yellow" coded AHM report likely will be transmitted over the data link and, non-colored reports are likely not transmitted over the data link.

Cost relevance may be updated per maintenance (Mx) "bulk-recorded" data link access time. In one example, maintenance access is immediately after the flight, so there is no adjustment to cost relevance. In another example, there are six more flights before Mx access, and the cost relevance priority increases significantly, which may lead the system 10 to calculate that the AHM report should be sent over the data link.

In another scenario, the cost of accessing the data link may be reduced as the aircraft moves into airspace where data link access is provided by a lower cost provider. The system 10 then calculates whether the cost of sending the report drop below that previously calculated. In one example, the reduced cost may be in the form of a modifiable constant change (via the uplink), of either the cost relevance table or of specific report values. In a more specific example, a cost other than financial may be considered, for example, key maintenance personnel going on vacation soon. The reduction of the cost relevance table results in more reports generated with associated increased maintenance dispositions/write-ups (until the personnel are on vacation). Finally, and as mentioned above, the aircraft may be able to access a lower cost report provider, or transmission technique, during the flight.

FIG. 5 is a priority level list table 500 that illustrates priority levels and an associated color code. Referring to table 500, in one example, a "Yellow" alert is generated during take-off, having a priority level of 100. With the data Link in Satcom mode, and the modifiable constant is set to support ACMS (Data Link) transmission if the "Satcom cost" level exceeds 249, then the yellow report is not transmitted.

In another example, maintenance will access quick access recorder (QAR) data after the flight, so no QAR data is transmitted over the data link. Continuing with another scenario, maintenance will not access the QAR data for one more additional flight, and the priority level increases to 150, and no QAR data is transmitted over the data links. When it is determined that an operating base that can work the yellow alert is verified, which is a cost factor component, the priority level doubles to 300, and the report is transmitted over the data link.

In another real world example, with an aircraft fault having a priority level of 100 is determined to exist. In a first portion of the flight, the aircraft is in a satellite communications mode, and a report with a level of 100 is not transmitted. However, as the flight continues, for example, during an approach, UHF communications can be used. The "UHF transmission cost" has a modifiable constant level of 50, which is less than the 100 alert level, and a data link transmission is then performed.

System 10 may be modified for trending, or tracking trends. In these examples, a trend report is generated prior to take-off, with a priority level of 20. With the data link in UHF mode, and the modifiable constant set to support ACMS (data link) reporting if the "UHF cost" level exceeds 50, no report is transmitted. In one scenario, maintenance will access QAR data after the flight, so no QAR data is transmitted over the data link. In another scenario, maintenance will not access the QAR data for three more flights, but the trend report shows 10 expected flights before servicing is needed, since the trending priority level is still 20, no QAR data is transmitted over the data link. In still another scenario, servicing is expected in three flights (the trending priority level is now 40), and the main operating base that can work such faults is verified by a cost relevance adjustment, which doubles the priority level to 80, exceeding the UHF cost level of 50, and the UHF transmission of the fault data is made over the data link. Finally, if there is no uplink change to constants and transmission methods, transmission costs are never decreased during the flight, therefore no data link transmission occurs.

Figure 6:
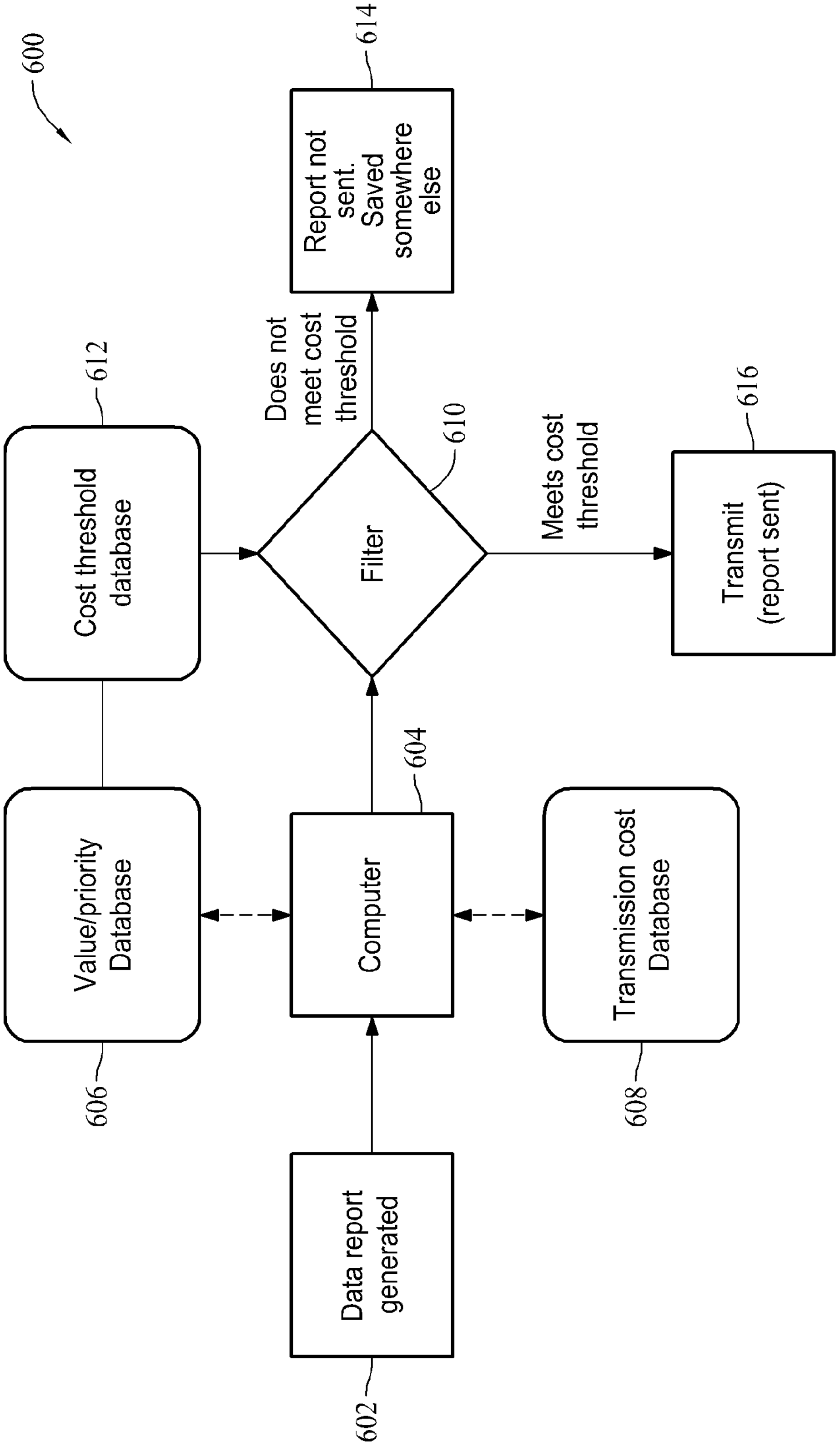
FIG. 6 is a flow diagram that further illustrates operation of the vehicle monitoring system of FIG. 1.

FIG. 6 is a flow diagram 600 that illustrates operation of embodiments of system 10, described above. Consistent with the description of FIGS. 3 and 4, a data report 602 is generated which is provided to the computer 604, for example, of system 10. Computer 604 has access to or is programmed with a value/priority database 606 and a transmission cost database 608. The data report 602 and databases 606 and 608 are provided to filter 610, which is programmed with (or accesses) a cost threshold database 612. If the data report, based on priority and cost, does not meet a cost threshold, the data report 602 is not transmitted, but is saved elsewhere 614, for example, within a memory for later access. However, if the data report, based on priority and cost, does meet a cost threshold, the data report 602 is transmitted 616, for example, over the data link, such that the necessary preparations for addressing the underlying causes of the data report 602 can commence on ground.

Figure 7:
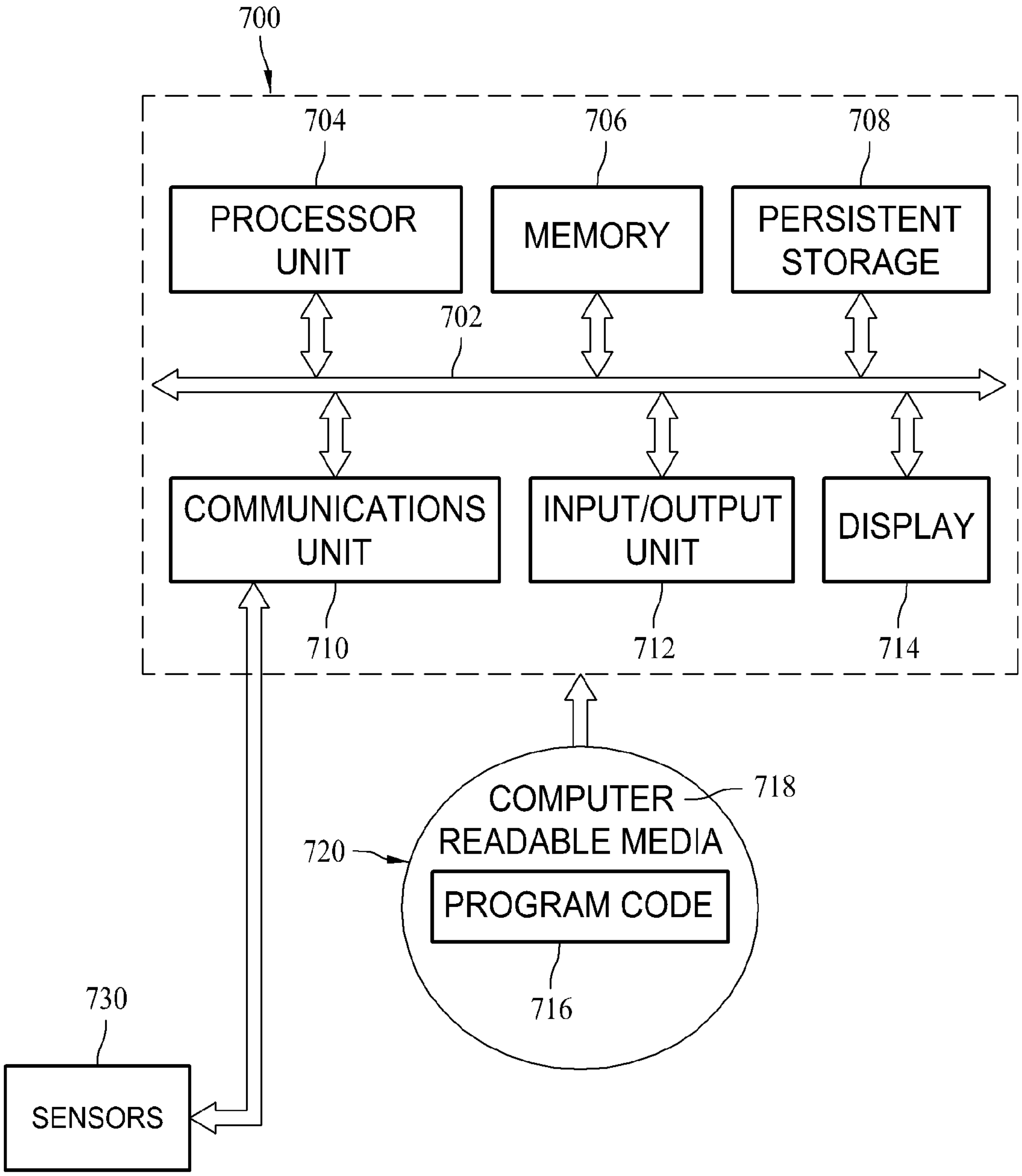
FIG. 7 is a diagram of a data processing system.

Turning now to FIG. 7, a diagram of an example data processing system 700 that might be utilized as computer 604 and/or within system 10 is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a set of one or more processors or may be a multi-processor core, depending on the particular implementation. Further, processor unit 704 may be implemented using one or more heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices. A storage device is any piece of hardware that is capable of storing information either on a temporary basis and/or a permanent basis. Memory 706, in these examples, may be, for example, without limitation, a random access memory or any other suitable volatile or non-volatile storage device. Persistent storage 708 may take various forms depending on the particular implementation. For example, without limitation, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, without limitation, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communication links, for example, to various sensors 730 from which aircraft health maintenance determinations and decisions are made.

Input/output unit 712 allows for input and output of data with other devices that may be connected to data processing system 700. For example, without limitation, input/output unit 712 may provide a connection for user input through a keyboard and mouse. Further, input/output unit 712 may send output to a printer. Display 714 provides a mechanism to display information to a user.

Instructions for the operating system and applications or programs are located on persistent storage 708. These instructions may be loaded into memory 706 for execution by processor unit 704. The processes of the different embodiments may be performed by processor unit 704 using computer implemented instructions, which may be located in a memory, such as memory 706. These instructions are referred to as program code, computer usable program code, or computer readable program code that may be read and executed by a processor in processor unit 704. The program code in the different embodiments may be embodied on different physical or tangible computer readable media, such as memory 706 or persistent storage 708.

Program code 716 is located in a functional form on computer readable media 718 that is selectively removable and may be loaded onto or transferred to data processing system 700 for execution by processor unit 704. Program code 716 and computer readable media 718 form computer program product 720 in these examples. In one example, computer readable media 718 may be in a tangible form, such as, for example, an optical or magnetic disc that is inserted or placed into a drive or other device that is part of persistent storage 708 for transfer onto a storage device, such as a hard drive that is part of persistent storage 708. In a tangible form, computer readable media 718 also may take the form of a persistent storage, such as a hard drive, a thumb drive, or a flash memory that is connected to data processing system 700. The tangible form of computer readable media 718 is also referred to as computer recordable storage media. In some instances, computer readable media 718 may not be removable.

Alternatively, program code 716 may be transferred to data processing system 700 from computer readable media 718 through a communications link to communications unit 710 and/or through a connection to input/output unit 712. The communications link and/or the connection may be physical or wireless in the illustrative examples. The computer readable media also may take the form of non-tangible media, such as communications links or wireless transmissions containing the program code.

In some illustrative embodiments, program code 716 may be downloaded over a network to persistent storage 708 from another device or data processing system for use within data processing system 700. For instance, program code stored in a computer readable storage medium in a server data processing system may be downloaded over a network from the server to data processing system 700. The data processing system providing program code 716 may be a server computer, a client computer, or some other device capable of storing and transmitting program code 716.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown.

As one example, a storage device in data processing system 700 is any hardware apparatus that may store data. Memory 706, persistent storage 708 and computer readable media 718 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 706 or a cache such as that found in an interface and memory controller hub that may be present in communications fabric 702.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for reporting aircraft data, said method comprising:

receiving, from a sensor onboard a vehicle, data relating to a condition experienced during operation of the aircraft;

determining by a processing device, a total cost relevance for transmitting the data at a specified time, the total cost relevance including a cost for transmitting the data;

determining, by the processing device, a maintenance time adjustment cost for not transmitting the data at the specified time, wherein the maintenance time adjustment cost includes a cost incurred from delaying maintenance of the aircraft based on not transmitting the data at the specified time;

comparing, by the processing device, the total cost relevance to the maintenance time adjustment cost for not transmitting the data at the specified time;

transmitting the data to an end user system if the total cost relevance exceeds the maintenance time adjustment cost for not transmitting the data;

storing the data in a memory if the total cost relevance does not exceed the maintenance time adjustment cost for not transmitting the data;

modifying the total cost relevance as a function of an amount of time until the data stored in the memory is accessed based at least partially on a number of remaining flights for the aircraft until data stored in the memory is accessed, such that a modified total cost relevance is defined; and transmitting the data to an end user system if the modified total cost relevance for transmitting the data stored in the memory exceeds a threshold.

2. The method according to claim 1 wherein the total cost relevance comprises determining a priority of the condition experienced during operation of the aircraft.

3. The method according to claim 1 further comprising transmitting any stored data from the memory to the end user system if at any point during a flight, at least one of a cost of a priority of the condition experienced during operation of the aircraft and the maintenance time adjustment cost for not transmitting the data exceeds the total cost relevance.

4. The method according to claim 1 wherein the data relating to a condition experienced during operation of the aircraft includes an aircraft health maintenance report.

5. A vehicle monitoring system onboard a vehicle, said system comprising:

at least one processing device;

at least one sensor communicatively coupled to said processing device, said at least one sensor configured to monitor operations of the vehicle or operations of components of the vehicle;

a memory communicatively coupled to said processing device; and at least one communications interface communicatively coupled to said processing device, said system programmed to:

receive, from said at least one sensor, data relating to a condition experienced during operation of the vehicle;

determine a total cost relevance for transmitting the data at a specified time, the total cost relevance including a cost for transmitting the data;

determine a maintenance time adjustment for not transmitting the data at the specified time, wherein the maintenance time adjustment cost includes a cost incurred from delaying maintenance of the aircraft based on not transmitting the data at the specified time;

compare the total cost relevance to the maintenance time adjustment cost for not transmitting the data at the specified time;

transmit the data, via said at least one communications interface, to an external system if the total cost relevance exceeds the maintenance time adjustment cost for not transmitting the data;

store the data in said memory if the total cost relevance does not exceed the maintenance time adjustment cost for not transmitting the data;

modify the total cost relevance as a function of an amount of time until the data stored in the memory is accessed based at least partially on a number of remaining trips for the vehicle until data stored in the memory is accessed, such that a modified total cost relevance is defined; and transmit the data to the external system if the modified total cost relevance for transmitting the data stored in the memory exceeds a threshold.

6. The vehicle monitoring system according to claim 5 wherein said memory comprises a priority level table, and wherein to determine a total cost relevance for the data, said system is programmed to determine a priority of the condition experienced during operation of the vehicle based on said priority level table.

7. The vehicle monitoring system according to claim 6 wherein the threshold comprises a modifiable constant within said memory.

8. The vehicle monitoring system according to claim 5 wherein the vehicle is an aircraft and the data relating to a condition experienced during operation of the vehicle includes an aircraft health maintenance report.

9. The vehicle monitoring system according to claim 5 wherein the vehicle is an aircraft and said system is programmed to adjust the total cost relevance for the data based on a number of remaining flights for the aircraft until data stored in said memory is accessed.

10. The method according to claim 1, wherein the total cost relevance for transmitting the data includes a transmission fee for transmitting the data.

* * * * *